United States Patent [19]

Wellett

[11] 4,226,462
[45] Oct. 7, 1980

[54] CAR DOOR TRANSFER SEAT FOR HANDICAPPED PERSONS

[76] Inventor: Gabriel Wellett, 22797 Rosalind Ave., East Detroit, Mich. 48021

[21] Appl. No.: 938,464

[22] Filed: Aug. 31, 1978

[51] Int. Cl.³ .............................................. B60N 1/02
[52] U.S. Cl. ........................................................ 296/68
[58] Field of Search .................. 296/67, 68, 63, 65 R, 296/66; 108/44, 46; 292/336.3; 297/256

[56] References Cited

U.S. PATENT DOCUMENTS

| | | | |
|---|---|---|---|
| 1,210,789 | 1/1917 | Freedman | 296/67 |
| 1,759,878 | 5/1930 | Zizzo | 108/44 |
| 3,858,922 | 1/1975 | Yamanaka | 292/336.3 |
| 3,865,431 | 2/1975 | Zakhi | 108/44 |

FOREIGN PATENT DOCUMENTS 875049 8/1961 United Kingdom ...................... 296/67

Primary Examiner—John J. Love
Assistant Examiner—John A. Carroll
Attorney, Agent, or Firm—Basile, Weintraub & Hanlon

[57] ABSTRACT

A car door seat assembly for handicapped persons includes a support attached to the inside wall of a door of a vehicle to facilitate the transfer of non-ambulatory persons from a wheel chair or crutches to the seat of an automobile.

6 Claims, 4 Drawing Figures

U.S. Patent  Oct. 7, 1980  Sheet 1 of 2  4,226,462
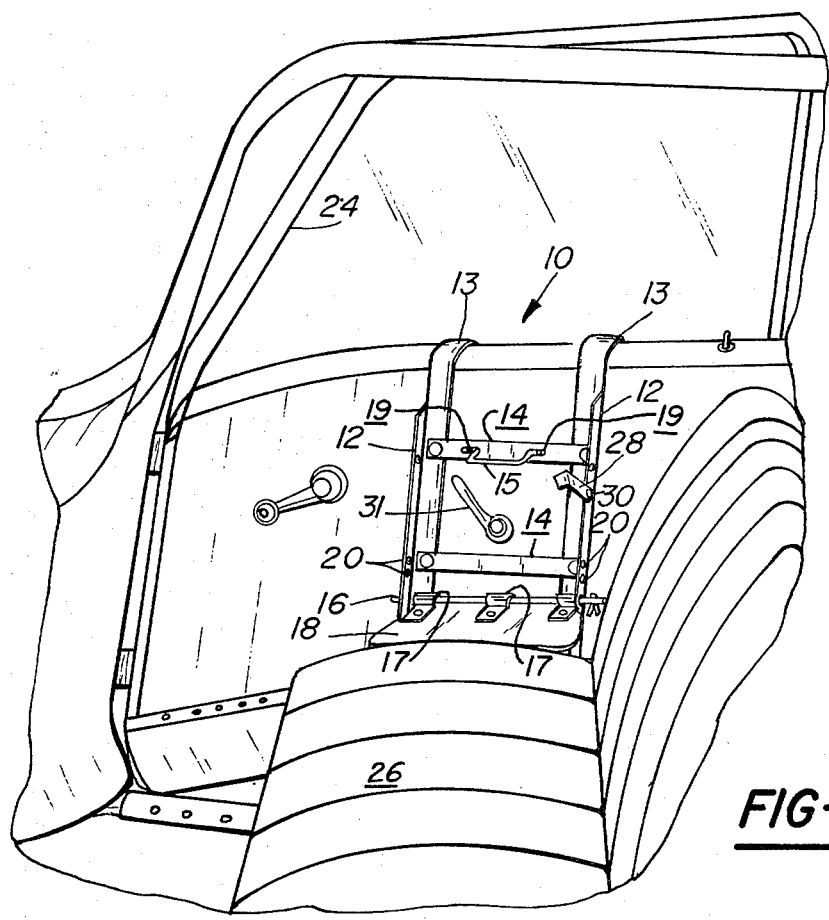
FIG-1
FIG-3
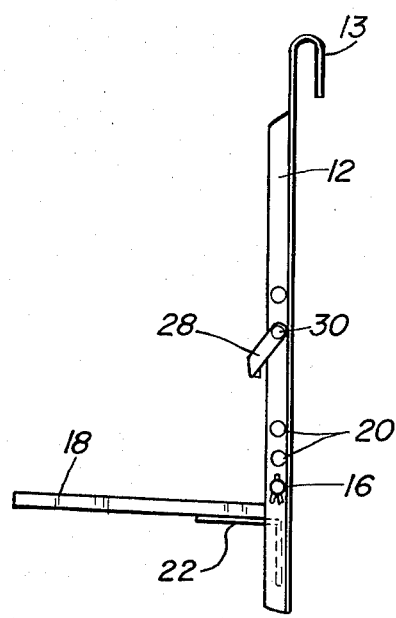

CAR DOOR TRANSFER SEAT FOR HANDICAPPED PERSONS

BACKGROUND OF THE INVENTION

I. Field of the Invention

The present invention relates to aids in transporting handicapped persons, and in particular to aids and means for transferring handicapped persons into automobiles.

II. Prior Art

Devices for assisting disabled or handicapped persons into automobiles are known such as special doors, hydraulic or electrical lifts and the like are known. These devices are expensive to make and sell and, furthermore, require extensive modification of the car to be installed. Furthermore, powered devices for assisting persons into a car are prone to mechanical problems, such as wear and exposure to the elements, thus, requiring expensive maintenance. These problems amplify the need for providing an inexpensive, simple, reliable device for enabling the transfer of non-ambulatory persons into a car that requires little or no modification of the car to be used.

SUMMARY OF THE INVENTION

The present invention provides a car door transfer seat assembly for handicapped persons that comprises a seat and a support. The support is mounted onto the inside wall of a car door. The seat which is mounted onto the support, can be folded up against the inside wall of the door to be out of the way when not in use. Alternatively, the seat can be folded up and removed from the support to be stored elsewhere in the car when not needed. The present invention also provides means for holding the seat in its upright position against the door when not in use and means for opening the door from the inside when the normal door opener is covered by the seat.

These and other features, objects and applications of the present invention will become apparent to those skilled in the art to which the invention pertains when the accompanying description of one example of the best mode contemplated for practicing the invention is read in conjunction with the accompanying drawings.

BRIEF DESCRIPTION OF THE DRAWINGS

The description herein makes reference to the accompanying drawings wherein like reference numbers refer to like parts throughout the several views, and wherein:

FIG. 1 is an enlarged perspective view of the present invention and illustrating selection of the angle and elevation of the seat for mating with a seat of a vehicle;

FIG. 3 is a partial rear view of the seat taken from point 3—3 in FIG. 2; and

DESCRIPTION OF THE PREFERRED EMBODIMENTS

Figure 2:
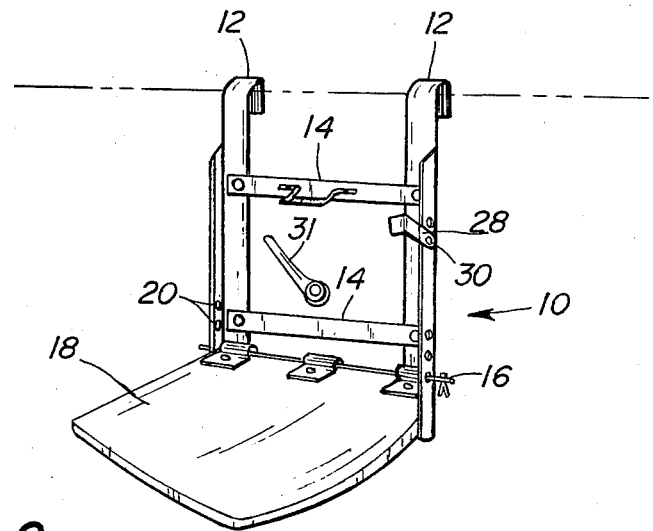
FIG. 2 is a perspective view of the preferred embodiment of the present invention.

Now, with reference to the drawings, and in particular to FIG. 1 wherein there is depicted a car door transfer seat assembly at 10 for transferring non-ambulatory persons into a car. The assembly hereof, generally, comprises a support 11 and a seat 18 supported thereby. As shown in the drawing, the support generally comprises a pair of spaced apart rails 12 which support the seat 18 in a manner to be more fully described later. In the preferred embodiment each rail 12 comprises a right angle structural piece having a top end and a bottom end. The top end of the pair of rails 12 have the inward facing flange of the angle piece removed and the remaining planar portion is bent outward in an arcuate forming a hook 13. The hook 13 rests upon the sill of the door 24, forming a support for the pair of rails 12. In the preferred embodiment, a pair of transverse braces 14 are fixedly attached to the rails 12 at a point near their lower end and near their upper end where the arcuate begins. A pair of holes through the braces 14 near the ends thereof cooperating with a mating pair of holes in each of the rails provide a receptical for a pair of threaded fasteners or rivets for fixedly attaching the braces 14 to the pair of rails 12, establishing the spacing of the pair of rails 12 thereby. A multiplicity of apertures 20 are disposed in the inward facing flange of the pair of rails 12 at their lower end. A transverse hinge rod 16 is supported by any pair of apertures 20 in the opposed pair of rails 12. The transverse hinge rod 16 hingedly supports the seat 18 along its edge nearest the door by means of a multiplicity of hinges 17. The hinges 17 have a transverse half round channel at one end for slidingly engaging the hinge rod 16. The hinges 17 are fastened to the seat 18 by means of screws or the like. The hinges 17 cooperate with the rod 16 to define a pivot means for the seat 18 along the seats edge adjacent to the door 24. Snap fasteners, cotter keys, acom nuts or the like are affixed to the ends of rod 16 to hold it in place. By selecting an appropriate pair of apertures 20 for supporting the rod 16, the height and transverse angle of the seat 18 can be chosen to match seating surface of the car seat 26.

The sides of the seat 18 curve forward to present an edge approximately perpendicular to the axis of the car when the door 24 is open. The end of the seat 18 opposite the hinge is shaped to abut the end of the car seat 26 when the seat 18 is in its down position and the car door 24 is moved toward its closed position. A "V" shaped handle 15 is fixedly attached to the upper transverse brace 14 at its approximate center. A pair of holes at the ends of the handle 15 are alligned with a matching pair of holes in the transverse brace 14, and a pair of threaded fasteners 19 fixedly attach the handle 15 to the brace 14. A pair of angle brackets 22 (only one of which is shown) are attached to the bottom of the seat at the sides near the hinges 17 by screws or the like, to hold the seat 18 in a horizontal position when it is lowered. A reinforcing bar 23 extending between the brackets 22 improves structural integrity. A pair of holes at each end of the bar 23 cooperate with a matching pair of holes in the angle brackets 22 to receive threaded fasteners for fixedly attaching the bar 23 to the pair of brackets 22.

In another embodiment of the support, the upper end of the spaced apart rails begins a distance spaced below the sill of the car door 24. A pair of planar bars 13 with arcuate ends forming a hook facing outward are attached to the upper end of the rails 12. A hole in the lower end of bars 13 is alligned with a hole in the upper end of rails 12 to receive a threaded fastener for fixedly attaching bars 13 to the top of rails 12. The hooked end of bars 13 rest on the sill of car door 24 forming a support for the pair of rails 12.

In yet another embodiment of the invention, the pair of rails 12 are permanently attached to the inside surface of the car door with suitable threaded fasteners. In this embodiment the arcuate hooked ends 13 of the support can be eliminated.

To use the car door transfer seat, the door is first opened. The arcuate ends forming a hook on rails 12 are placed over the window sill and the seat 18 is placed in its lowered position. The user is then seated on the seat 18 facing forward, and the door 24 is moved toward the car seat 26 until the end of seat 18 abuts the end of the car seat 26. The user can then slide off the seat 18 onto the car seat 26 using the handle 15 for support and to hold the end of seat 18 in abutment with seat 16. The car door transfer seat 10 is then removed from the door and stored elsewhere in the car or seat 18 can be folded into an upright position and held in that position by a latch 28 pivoted to one of the rails 12 by means of a pivot pin 30.

Figure 4:
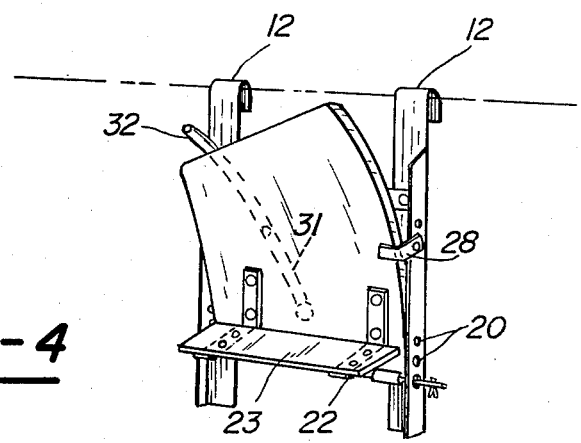
FIG. 4 is a perspective view of the seat in its folded up position.

When the seat 18 is in its upward position, FIG. 4, safety dictates that the door opener have an extension 32 attached thereto to allow the door to be opened with the seat 18 in that position. However if the seat is removed after use and before the car is started, the door opener 31 extension 32 would not be required.

Having thus described my invention, what I claim is:

1. A car door transfer seat for handicapped persons comprising:
   a support attached to the inside surface of a car door;
   a seat horizontally supported by said supports at a level of the front seat;
   a handle attached the support for aiding handicapped persons in entering and leaving the vehicle;
   sides of the seat curving forward to present an edge approximately perpendicular to the car axis when the door is open; and
   an end of the seat opposite the hinge shaped to abut an end of the car seat when the seat is in its down position and the door is moved toward a closed position.

2. A car door transfer seat for handicapped persons as defined in claim 1 further comprising:
   a pair of spaced apart rails disposed vertically along the inside wall of a car door, the lower end of said rails beginning below the seating surface of the front seat, the upper end of said rails fixedly attached to the inside wall of said door;
   a pair of transverse braces extending horizontally between rails, the upper brace having ends fixedly attached to the rails at a point spaced below the upper end of said rails, the lower brace having ends fixedly attached to the rails at a point spaced above the lower end of said rails;
   a transverse hinge rod extending between rails from a point spaced between the bottom end of said rails and said lower brace, said hinge rod slidingly supported at its ends by a pair of apertures in each of said pair of rails;
   a seat hingedly attached to said transverse hinge rod; and
   a pair of angle braces attached to the bottom of said seat at the sides adjacent to said hinge rod, said braces resting against the lower ends of said rails to hold said seat in a horizontal plane when lowered.

3. A car door transfer seat for handicapped persons as defined in claim 2 wherein:
   said vertical rails have outwardly curving upper ends forming a hook to be placed over the sill of a window to vertically support said car door transfer seat.

4. A car door transfer seat for handicapped persons as defined in claim 3 wherein:
   a swiveled hook latch is attached to one of said rails to hold said seat upright against said door when not in use.

5. A car door transfer seat for handicapped persons as defined in claim 4 wherein:
   an extension bar is attached to the door opening mechanism to render said door openable when said seat is upright against said door covering said opener handle.

6. A car door transfer seat for handicapped persons as defined in claim 1 wherein:
   a multiplicity of apertures are provided in said pair of rails, any pair of apertures to support said hinge rod, providing a multiplicity of vertical positions and angles for said seat to mate with the car seat.

* * * * *